Nov. 21, 1950 — A. N. GROTZ — 2,530,873
GARDEN HOSE HOLDER
Filed Nov. 10, 1948
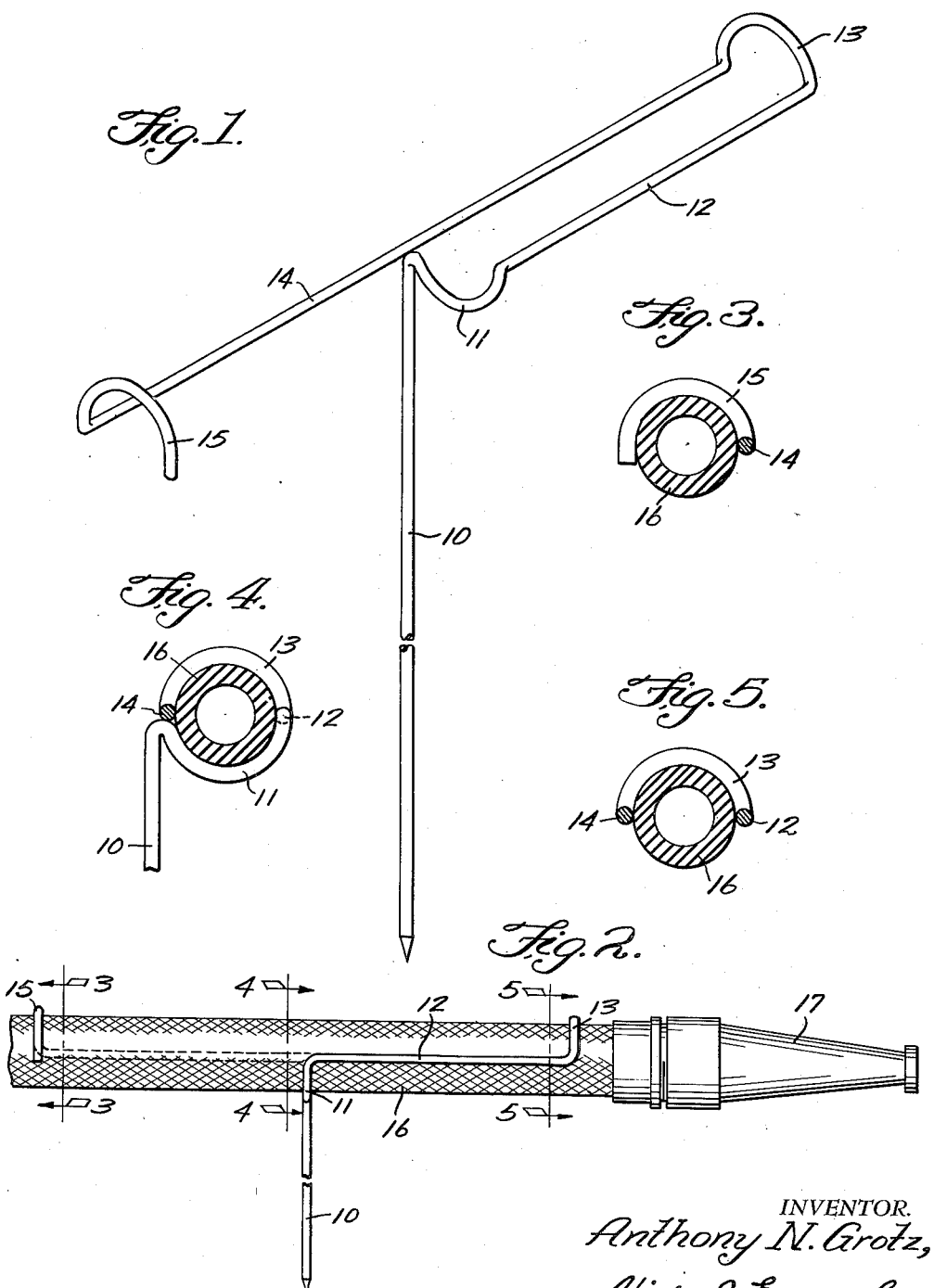
INVENTOR.
Anthony N. Grotz,
BY Victor J. Evans & Co.
ATTORNEYS Patented Nov. 21, 1950

2,530,873

UNITED STATES PATENT OFFICE 2,530,873

GARDEN HOSE HOLDER

Anthony N. Grotz, Chicago, Ill.

Application November 10, 1948, Serial No. 59,247

3 Claims. (Cl. 248—76)

This invention relates to small stands or devices for supporting the nozzle end of garden hose while spraying water on grass, plants and the like, and in particular a small stand formed of a single strand of relatively heavy wire having a center loop providing a saddle for holding the underside of the hose with spaced end loops formed to be extended over the upper surface of the hose.

The purpose of this invention is to provide a device for supporting the nozzle end of garden hose that may readily be attached to the hose and which is provided with a point adapted to be inserted in the ground to prevent movement of the nozzle while spraying.

Various devices have been provided for supporting the nozzle end of garden hose, but where the devices are provided with means for securing the hose therein, clamps including screws or bolts are used and the screws eventually rust or corrode so that it is difficult to remove the devices from the hose. With this thought in mind, this invention contemplates a simple spring wire loop arrangement having a point extended therefrom in which the hose may readily be snapped into the loops and supported for spraying.

The object of this invention is, therefore, to provide means for forming a single wire strand wherein the nozzle end of garden hose may be supported by a point inserted in the ground and positively secured in the position for spraying.

Another object of the invention is to provide a hose attachment in the form of a small stand to support the nozzle end of a hose in spraying in which the device may be attached to the hose without screws, bolts and the like.

A further object of the invention is to provide a simple, unique supporting device for the nozzle end of garden hose which is of a simple and economical construction.

With these and other objects and advantages in view, the invention consists of the new and useful combination, construction and arrangement of parts as hereinafter more fully described, set forth in the claims appended hereto, and disclosed in the accompanying drawings forming part hereof, wherein:

Figure 1 is a view illustrating the support or holder with the parts in their relative position;

Figure 2 is a view showing a side elevation of the holder with a hose having a nozzle thereon supported therein;

Figure 3 is a cross-section through the nozzle end hose taken on line 3—3 of Figure 2;

Figure 4 is a similar cross-section through the device taken on line 4—4 of Figure 2;

Figure 5 is also a cross-section through the device taken on line 5—5 of Figure 2.

Referring now to the drawings, wherein like reference characters denote corresponding parts, the garden hose holder of this invention is formed of a continuous strand of wire or of a small rod and the wire is shaped to provide a vertically disposed point 10 with a semi-circular loop 11 at the upper end thereof and from the far end of the loop the wire extends perpendicular to the point 10 providing a bar 12 and an upwardly extended semi-circular loop 13 is provided at the far end of the bar 12. From the opposite side of the loop 13, a wire extends backwardly toward the point providing a bar 14 also perpendicularly positioned in relation to the point and this bar extends a distance beyond the point substantially equal to that from the loop 13 to the point and a loop 15, which is also substantially semi-circular, extends upwardly from the end of the bar 14.

With the parts arranged in this manner, the end of a garden hose 16 having a nozzle 17 thereon may be placed through the holder with the hose resting in the loop 11 which forms a saddle and with the end loops 13 and 15 pressed over the upper side of the hose, as illustrated in Figure 2. As back pressure develops in the hose resulting from water rushing from the nozzle, the hose assumes a slightly arcuate shape whereby it is firmly gripped between the loops so that as water is sprayed from the hose, it is secured by tension in the holder.

It is preferred to use relatively heavy spring wire for the holder, however, it will be understood that the holder may be made of any suitable material.

It will also be understood that modifications may be made in the design or arrangement of the parts without departing from the spirit of the invention.

What is claimed is:

1. A garden hose holder having a centrally disposed post with a pointed lower end and with an arcuate saddle positioned on the upper end, arcuate oppositely positioned holding elements spaced from the post and saddle, a bar connecting the said arcuate holding elements and a bar on the opposite side of the holder connecting the saddle at the upper end of the post to one of the said arcuate holding elements whereby the said arcuate holding elements and bar connecting the elements are suspended from the saddle at the upper end of the post.

2. A garden hose holder comprising a vertically disposed centrally positioned post having a pointed lower end with a downwardly extended semi-circular saddle extended laterally from the upper end of the post, and upwardly extended substantially semi-circular holding elements spaced from the saddle and supported therefrom by horizontally disposed bars, one of said bars extended from the saddle at the upper end of the post and connected to one of the semi-circular holding elements at one side of the holder and another bar at the opposite side of the holder connecting the said semi-circular holding elements.

3. A garden hose support comprising a vertically disposed post having a laterally extended substantially semi-circular saddle at the upper end with a bar extended from the opposite end of the saddle perpendicular to the post, and upwardly extended semi-circular holder positioned at the end of the bar, another bar parallel to the former bar and extended from the opposite side of the semi-circular holder past the post and to a point substantially the same distance on the opposite side of the post and having another upwardly extended semi-circular holder carried by the end thereof.

ANTHONY N. GROTZ.

REFERENCES CITED

The following references are of record in the file of this patent:

UNITED STATES PATENTS

| Number | Name | Date |
|---|---|---|
| 651,980 | Sherwood | June 19, 1900 |
| 2,013,447 | Reiter | Sept. 3, 1935 |
| 2,425,893 | Molitor | Aug. 19, 1947 |